Aug. 4, 1964 A. O. WIST 3,143,713

SQUARE WAVE OSCILLATOR INDEPENDENT OF SUPPLY VOLTAGE VARIATIONS

Filed Oct. 16, 1961

INVENTOR
ABUND O. WIST

BY James A. Eisenman

ATTORNEY

United States Patent Office 3,143,713

Patented Aug. 4, 1964

3,143,713

SQUARE WAVE OSCILLATOR INDEPENDENT OF SUPPLY VOLTAGE VARIATIONS

Abund O. Wist, 60 Knight Bridge Road, Great Neck, N.Y.

Filed Oct. 16, 1961, Ser. No. 145,209
8 Claims. (Cl. 331—52)

The present invention relates to voltage waveform generators. More particularly, it concerns square wave oscillators such as astable and monostable multivibrators employing transistors.

Variations in the supply voltage or the properties of the transistors used in such oscillators may affect the durations of the square wave voltage excursions that are produced. In the case of an astable multivibrator, the operating frequency may change. Moreover, the leading and trailing edges of the square waveforms may not be as abrupt and as sharply defined as is desired.

Therefore, it is an object of the present invention to provide a square wave oscillator for producing voltage excursions of substantially constant duration regardless of supply voltage variations.

Another object is to provide a timing circuit for generating an abrupt and sharply defined voltage surge which takes place at the end of a definite time interval following a switching operation.

A further object is to provide an astable multivibrator that employs transistors for producing sharply defined square wave oscillations whose frequency is substantially independent of the operating voltage and the properties of the transistors.

Still a further object is to provide such a multivibrator that has two stages of amplification and a minimum number of elements.

Yet another object is to provide a monostable multivibrator that employs transistors, the running time for a change from the multivibrator's stable condition to its other condition and back to its stable condition being substantially constant even though the operating voltage or properties of the transistors may vary.

The foregoing and other objects and advantages of the present invention, which will become further apparent from the detailed description of the drawings, are achieved by a resistor voltage divider and by a resistor-condenser voltage divider connected together to form a four terminal bridge. The control electrode and a main electrode of a switching transistor are connected between second and fourth terminals of the bridge. The other main electrode of the switching transistor is connected to a third terminal of the bridge by a resistor or by the control electrode and the main electrode of a further transistor. The bridge is connected to the terminals of a voltage supply source and the switching transistor, which initially is cut off, conducts heavily only after a definite time interval when the potential between the second and fourth bridge terminals reaches a predetermined value.

If a resistor connects the other main electrode of the switching transistor to the third bridge terminal, a voltage surge is generated across this resistor at the moment the switching transistor conducts heavily. If a further transistor connects the other main electrode of the switching transistor to the third bridge terminal, the further transistor conducts heavily while the switching transistor is cut off. This is reversed when the switching transistor becomes conductive. After the switching transistor conducts for a predetermined interval, the operation again reverses and is repeated periodically unless means are provided to limit the operation to that of a monostable oscillator as is explained further below.

Referring to the drawings.

Figure 1:
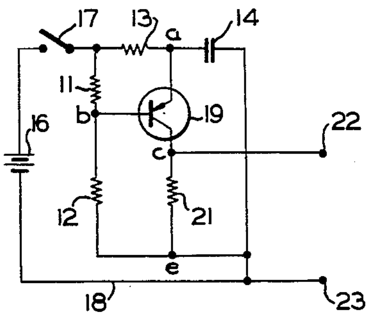
FIG. 1 is a timing circuit for generating a voltage surge at the end of a definite time interval following a switching operation.

Referring to FIG. 1, a first voltage divider is shown consisting of resistors 11 and 12. A second voltage divider consists of a resistor 13 and a condenser 14. The two voltage dividers are connected to form a bridge having four arms and four terminals.

A first terminal of the bridge is connected to the positive terminal of a unidirectional supply voltage source 16 by a switch 17, the switch being shown in its open position. A third terminal of the bridge is connected to the negative terminal of source 16 by a lead 18.

The base (a control electrode) and the emitter (a main electrode) of a switching transistor 19 are connected, respectively, to the second terminal (point *b*) and the fourth terminal (point *a*) of the bridge. The collector (the other main electrode) of transistor 19 is connected to the third terminal (point *e*) of the bridge by a resistor 21. Thus, a voltage generating circuit is provided whose output terminals are 22 and 23.

In operation of the circuit shown in FIG. 1, at the moment switch 17 is closed, point *a* goes negative with respect to point *b* because the voltage across the condenser 14 cannot change instantaneously. As the condenser 14 charges, the voltage at point *a* rises exponentially, the voltage at point *b* remaining substantially constant. The transistor 19 is essentially non-conducting because its base-emitter bias is of the wrong polarity.

After a definite time interval which is dependent upon the R-C time constant of resistor 13 and condenser 14 and the value of the reference voltage at point *b*, the voltage at point *a* equals the voltage at point *b*. The transistor 19 becomes heavily conductive between its emitter and collector, and current flows through resistor 21 to produce a sharp rise in voltage at point *c* so that a waveform appears across the output terminals 22 and 23.

The rise in voltage at point *c* is produced after a definite time interval following the closing of switch 17. This time interval is independent of variations in the voltage produced by source 16 as long as the values of the resistors and the condenser in the circuit remain constant. Moreover, at the moment transistor 19 becomes conductive, the voltage change at point *c* is quite abrupt and sharp, which is extremely desirable in timing circuits.

Figure 2:
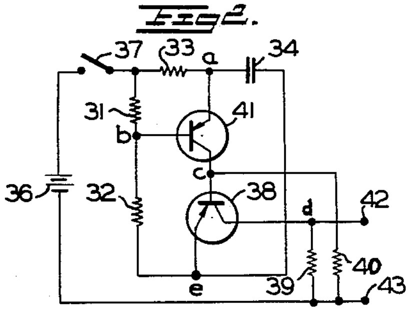
FIG. 2 is an astable multivibrator circuit in accordance with one embodiment of the invention.

Utilizing the principles of construction in FIG. 1, an astable multivibrator for producing square wave oscillations is shown by FIG. 2. The first voltage divider is formed by resistors 31 and 32, the second voltage divider being formed by resistor 33 and a condenser 34. The two voltage dividers are connected to form a bridge having four arms and four terminals.

A first terminal of the bridge is connected to the positive terminal of a unidirectional supply voltage source 36 by a switch 37. A third terminal of the bridge is connected to the negative terminal of source 36 by the emitter-collector path of a transistor 38 and a resistor 39.

The base (a control electrode) and the emitter (a main electrode) of a switching transistor 41 are connected respectively to the second terminal (point *b*) and the fourth terminal (point $a$) of the bridge in FIG. 2. The collector (the other main electrode) of transistor 41 is connected to the base or control electrode of the transistor 38. A junction point $c$ between the collector of transistor 41 and the base of transistor 38 is connected to the negative terminal of source 36 by a resistor 40. Output terminals for the multivibrator are at 42 and 43.

The multivibrator shown in FIG. 2 operates as an astable square wave oscillator in the following manner. Upon closing switch 37, current flows first over the voltage divider consisting of resistors 31 and 32, the emitter-collector path of the transistor 38, and the resistor 39. The switching transistor 41 is essentially non-conducting because point $a$ goes negative with respect to point $b$ due to the fact that the voltage across condenser 34 cannot change instantaneously. As the condenser 34 charges through resistors 33, 31 and 32, the voltage at point $a$ rises exponentially to equal the voltage at point $b$, and the switching transistor 41 conducts heavily between its emitter and collector.

At the moment transistor 41 conducts, the voltage at point $c$ immediately becomes more positive than the voltage at point $e$, and transistor 38 is essentially cut off. Condenser 34 then begins to discharge over the emitter-base path of transistor 41 and the resistor 32. This discharge also occurs to a small extent through resistors 33 and 31.

The voltage across condenser 34 decreases exponentially, as does the base current of transistor 41 until transistor 41 no longer conducts between its emitter and base. The voltage $V_{ac}$ between the emitter and collector of the transistor 41 then increases rapidly, point $c$ going negative, and the emitter-base bias of transistor 38 is of the proper polarity to make transistor 38 conduct heavily between its emitter and collector while transistor 41 is essentially cut off. In this manner the starting condition of the circuit is reached and one operating cycle is completed. The cycle is repeated periodically as long as switch 37 remains closed.

The frequency of the oscillations produced and the duration of the first condition wherein transistor 38 is conducting heavily and transistor 41 is substantially non-conducting, and the duration of the second condition wherein transistor 41 is conducting heavily and transistor 38 is substantially non-conducting, are substantially independent of variations in the magnitude of the supply voltage produced by source 36 and variations in the properties of transistors 38 and 41. The operating frequency and durations of the above mentioned first and second conditions are dependent only on the resistance values of resistors 33, 31, and 32 and the capacitance value of condenser 34. Moreover at the output terminals 42 and 43 the leading and trailing edge of each square waveform is abrupt and sharply defined.

Figure 3:
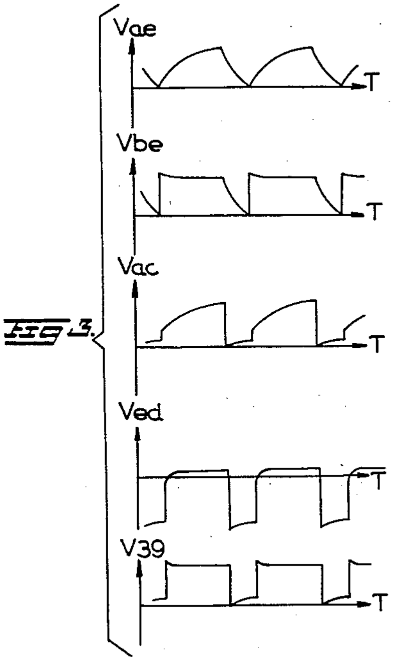
FIG. 3 is a group of voltage waveforms that appear at various points in the circuit of FIG. 2.

In order to understand the operation of the circuit shown in FIG. 2 even more clearly, the waveforms shown in FIG. 3 are useful. Each waveform is an illustration of the voltage that appears between two particular points in the circuit of FIG. 2 as a function of time T. For example, the first waveform is a plot of the voltage $V_{ae}$ across the condenser 34; the second waveform is the voltage $V_{be}$ across the resistor 32; the third waveform is the voltage $V_{ac}$ across the emitter-collector electrodes of transistor 41; the fourth waveform $V_{ed}$ is the voltage across the emitter-collector electrodes of the transistor 38; and $V_{39}$ is the voltage that appears across the resistor 39 and between the output terminals 42 and 43.

Figure 4:
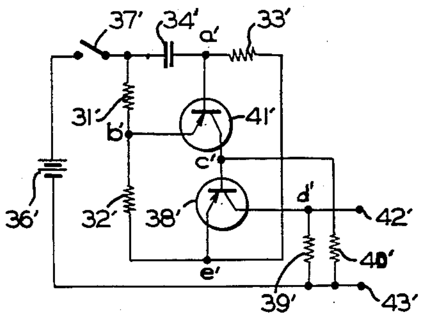
FIG. 4 is a slightly different form of an astable multivibrator circuit in accordance with the invention.

A slightly different arrangement of the astable multivibrator shown in FIG. 2 is illustrated in FIG. 4. Similar elements have been given primed reference numerals. Essentially, the only differences are that the sequence of the resistor and condenser in the second voltage divider has been reversed, and the emitter of transistor 41′ is connected to the second bridge terminal $b'$ between resistors 31′ and 32′, the base of transistor 41′ being connected to the fourth bridge terminal $a'$ between condenser 34′ and resistor 33′.

Although the operation of the circuit shown in FIG. 4 is not exactly the same as that shown in FIG. 2, it is similar. Initially when switch 37′ is closed and transistor 38′ is conducting heavily, the voltage at point $a'$ goes positive with respect to the voltage at point $b'$ and transistor 41′ is essentially non-conductive between its emitter and collector. As the capacitor 34′ charges through resistors 31′, 32′ and 33′, the emitter-base potential of transistor 41′ is reduced to zero and transistor 41′ becomes heavily conductive between its emitter and collector. At this point transistor 38′ becomes essentially non-conductive, and the capacitor 34′ begins to discharge through the transistor 41′ and the resistors 33′, 32′ and 31′ until the emitter-collector current of transistor 41′ decreases sufficiently to lower the voltage at point $c'$ until transistor 38′ again conducts heavily. At this point, transistor 41′ becomes essentially non-conducting and the operating cycle is completed. As long as switch 37′ remains closed, the above operation is repeated periodically to produce a recurring square wave voltage waveform of constant frequency and sharply defined edges at the output terminals 42′ and 43′.

Figure 5:
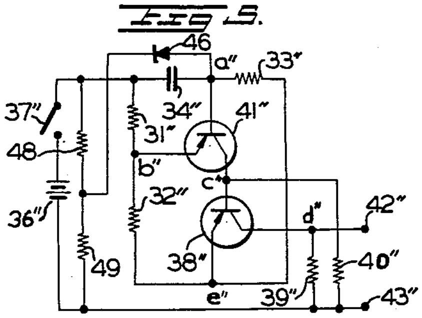
FIG. 5 is a monostable multivibrator circuit in accordance with another embodiment of the invention.

A monostable oscillator can be formed from either of the astable oscillators shown in FIGS. 2 and 4 by the provision of a special base circuit for the transistor 41 in the circuit of FIG. 2 or the transistor 41′ in the circuit of FIG. 4. An embodiment of such a monostable oscillator by modifying the circuit of FIG. 4 is shown in FIG. 5. Corresponding elements in FIG. 5 have double primed reference numerals.

In the monostable circuit shown in FIG. 5, the anode of a diode 46 is connected to the base of transistor 41″. The cathode of diode 46 is connected to the junction between the resistors 48 and 49 of a further voltage divider across the terminals of the voltage supply source 36″. The relative resistance values of resistors 48 and 49 as well as the resistance values of the other resistors in FIG. 5 are chosen properly so that the circuit operates in the following manner.

Upon closing switch 37″ the current flows first through the voltage divider consisting of resistors 31″, 32″, through the emitter-collector path of transistor 38″ and the resistor 39″. The voltage across resistor 39″ rises abruptly to initiate a square wave pulse. Transistor 38″ thus first is in a heavily conducting state, transistor 41″ being essentially non-conducting. Condenser 34″ charges until the potential at point $a''$ is less than that of point $b''$, whereby transistor 41″ becomes heavily conductive between its emitter and collector.

Upon conduction of transistor 41″, the transistor current flow through resistor 40″ raises the potential at point $c''$ causing transistor 38″ to be essentially non-conducting between its emitter and collector. The voltage across resistor 39″ therefore falls abruptly to complete a square wave pulse.

Condenser 34″ begins to discharge through resistor 31″ and the emitter-base path of the transistor 41″, whereby the potential at point $a''$ increases exponentially. Before the potential at point $a''$ can exceed the potential at point $b''$, the diode 46 conducts because its cathode potential is lower than that of point $b''$. Thus a base current flows through the resistor 31″, the emitter-base path of the transistor 41″, the diode 46 and the resistor 49. Transistor 41″ remains heavily conducting between its emitter and collector and transistor 38″ is essentially non-conducting, which is the stable condition for the monostable oscillator of FIG. 5.

In order to change the monostable oscillator of FIG. 5 back from its stable operating state to its unstable state, a negative trigger pulse is supplied to point $c''$ for driving the base of transistor 38″ negative with respect to its emitter. The transistor 38″ becomes heavily conductive and the voltage across resistor 39″ rises abruptly. Current flow through transistor 38″ lowers the voltage at point $b''$ causing transistor 41'' to be cut off. Condenser 34'' then charges until transistor 41'' becomes heavily conductive again and transistor 38'' becomes essentially non-conductive as before. Thus, the circuit has returned to its stable state and the voltage across resistor 39'' falls abruptly to complete another square wave pulse between the output terminals 42'' and 43''. The duration of each pulse produced between the output terminals 42'' and 43'' is substantially independent of supply voltage variations and variations in the properties of the transistors and the diode in the circuit for essentially the same reasons given with respect to the previously described circuits.

Figure 6:
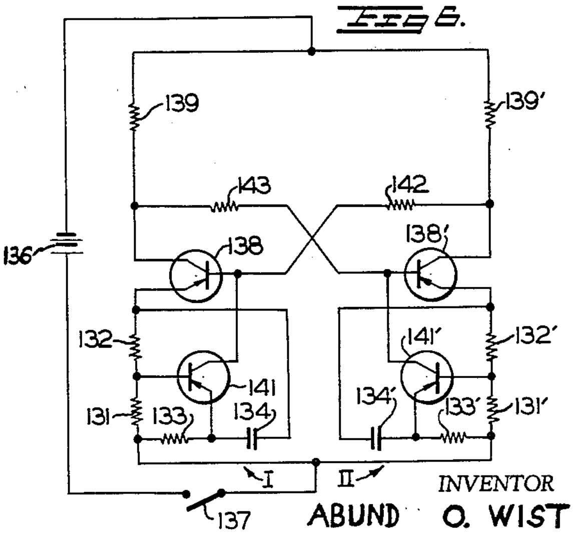
FIG. 6 is an astable multivibrator circuit constructed of two astable square wave oscillators in accordance with a further embodiment of the invention.

FIG. 6 shows another form of an astable multivibrator that employs two square wave oscillators I and II, each of which is like the oscillator shown in FIG. 2. In FIG. 6, three digit numbers are used to refer to the elements. Each number whose second and third digits form a number like one in FIG. 2, refers to a corresponding element. Also, in FIG. 6 the primed numbers refer to elements that are essentially duplicates of the elements referred to by corresponding unprimed numbers.

In FIG. 6, the base of the transistor 138 of square wave oscillator I is connected to the collector of the transistor 138' of the square wave oscillator II by a resistor 142. Similarly, the base of transistor 138' is connected to the collector of the transistor 138 by a resistor 143. Otherwise the construction of each of the square wave oscillators I and II is the same as that shown in FIG. 2, and the circuit operates as an astable multivibrator in substantially the same manner.

In the astable multivibrator of FIG. 6, the transistors 138 and 138' are heavily conductive simultaneously while the transistors 141 and 141' are essentially cut off. This is reversed as soon as condensers 134 and 134' have had sufficient time to charge, whereby transistors 141 and 141' both conduct heavily and transistors 138 and 138' are essentially cut off. The operation is reversed again when condensers 134 and 134' discharge to a predetermined voltage. A periodic square wave voltage waveform of predetermined frequency is produced across each of resistors 139 and 139'.

In the circuits shown in the drawings, PNP transistors have been illustrated. Obviously without departing from the scope of the invention the circuits could be modified to utilize NPN transistors instead of the PNP transistors, if desired.

Since many changes could be made without departing from the scope of the invention, and different words of description might have been used, it is understood that the invention is limited in scope solely by the accompanying claims.

I claim:

1. A square wave voltage generating circuit comprising a four terminal bridge having four arms, one of which includes a condenser, first and second transistors each having a control electrode and two main electrodes, means for connecting the control electrode and one of the main electrodes of said first transistor to second and fourth terimnals of said bridge, respectively, means for connecting the control electrode and one of the main electrodes of said second transistor to the other main electrode of said first transistor and a third terminal of said bridge, respectively, a pair of supply voltage terminals, means for connecting one of said supply voltage terminals to the first terminal of said bridge, and a load for connecting the other of said supply voltage terminals to the other main electrode of said second transistor.

2. A square wave voltage generating circuit comprising a first voltage divider having first and second resistors joined in series, a second voltage divider having a condenser and a third resistor joined in series, means for connecting the ends of said first and second voltage dividers to form a four terminal bridge with first and third terminals of said bridge being at the connections between the ends of said voltage dividers, respectively, the second and fourth bridge terminals being at the junction between said first and second resistors and the junction between said condenser and said third resistor, respectively, a first transistor comprising an emitter, a base and a collector, means for connecting said emitter to the fourth bridge terminal, means for connecting said base to the second bridge terminal, a second transistor having an emitter, a base and a collector, means for connecting the base of said second transistor to the collector of said first transistor, means for connecting the emitter of said second transistor to the third bridge terminal, a pair of voltage supply terminals, means including a load for connecting one of said supply terminals to the collector of said second transistor, and means for connecting the other of said supply terminals to the first terminal of said bridge.

3. The circuit set forth in claim 2 wherein the emitter of said first transistor is connected to the junction between said third resistor and said condenser, the base of said first transistor being connected to the junction between said first and second resistors, said condenser being connected between the emitters of said first and second transistors.

4. The circuit set forth in claim 2 wherein the emitter of said first transistor is connected to the junction between said first and second resistors, the base of said first transistor being connected to the junction between said third resistor and said condenser, said third resistor being connected between the base of said first transistor and the emitter of said second transistor.

5. A square wave voltage generating circuit comprising first and second resistors connected in series to form a first voltage divider, a third resistor and a condenser connected in series to form a second voltage divider, means for connecting the ends of said first and said third resistors to each other, means for connecting the end of said second resistor to one side of said condenser to form a bridge, a first transistor having an emitter, a base and a collector, means for connecting said emitter to the junction between said third resistor and said condenser, means for connecting said base to the junction between said first and said second resistors, a second transistor having an emitter, a base and a collector, means for connecting the base of said second transistor to the collector of said first transistor, means for connecting the emitter of said second transistor to the junction between said second resistor and said condenser, a pair of supply voltage terminals, means for connecting the junction between said first and said third resistors to one of said terminals, a fourth resistor connecting the other of said terminals to the collector of said second transistor, and means for connecting the junction between the collector of said first transistor and the base of said second transistor to the other of said supply voltage terminals.

6. A square wave voltage generating circuit comprising first and second resistors connected in series to form a first voltage divider, a condenser and a third resistor connected in series to form a second voltage divider, means for connecting the end of said first resistor to one side of said condenser, means for connecting the ends of said second resistor and said third resistor to each other to form a bridge, a first transistor having an emitter, a base and a collector, means for connecting said emitter to the junction between said first and second resistors, means for connecting the base to the junction between said condenser and said third resistor, a second transistor having an emitter, a base and a collector, means for connecting the base of said second transistor to the collector of said first transistor, means for connecting the emitter of said second transistor to the junction between said second and said third resistors, a pair of supply voltage terminals, means for connecting the junction between said first resistor and said condenser to one of said terminals, a fourth resistor connecting the other of said terminals to the collector of said second transistor, and a fifth resistor connecting the other of said terminals to the junction between the collector of said first transistor and the base of said second transistor.

7. The circuit set forth in claim 5, further including a sixth resistor and a seventh resistor connected in series across said supply voltage terminals, and a unidirectional device having an anode connected to the junction between said condenser and said third resistor, and said unidirectional device having a cathode connected to the junction between said sixth and said seventh resistors.

8. An astable square wave voltage generating circuit comprising a first four terminal bridge having four arms, one of which includes a condenser, first and second transistors each having an emitter, a base and a collector, means for connecting the base and the emitter of said first transistor to second and fourth terminals of said bridge, respectively, means for connecting the base and the emitter of said second transistor to the collector of said first transistor and the third terminal of said bridge, respectively, a pair of supply voltage terminals, means for connecting one of said supply voltage terminals to the first terminal of said bridge, a load for connecting the other of said supply voltage terminals to the collector of said second transistor, a second four terminal bridge having four arms, one of which includes a condenser therein, third and fourth transistors each having an emitter, a base and a collector, means for connecting the base and the emitter of said third transistor to second and fourth terminals of said second bridge, respectively, means for connecting the base and the emitter of said fourth transistor to the collector of said third transistor and third terminal of said second bridge, means for connecting said one of said supply voltage terminals to the first terminal of said second bridge, a second load for connecting the other of said supply voltage terminals to the collector of said fourth transistor, a resistor connecting the collector of said second transistor to the base of said fourth transistor, and a further resistor connecting the collector of said fourth transistor to the base of said second transistor.

References Cited in the file of this patent

UNITED STATES PATENTS 2,901,669 Coleman ---------------- Aug. 25, 1959